April 5, 1927.　　　　　E. G. OAKLEY　　　　　1,623,807
METHOD OF MAKING FLASH LIGHT CASINGS
Filed Aug. 12, 1924　　　3 Sheets-Sheet 1
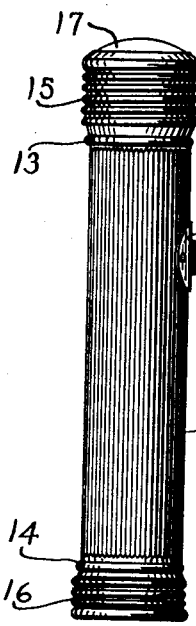
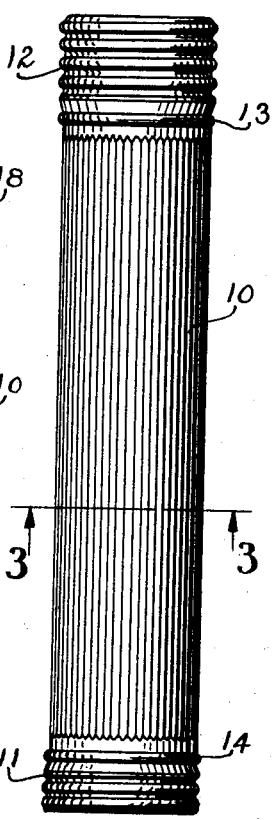
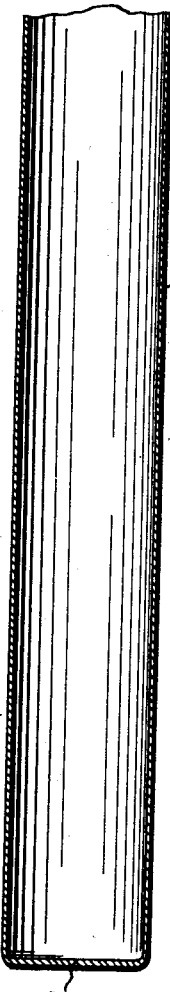
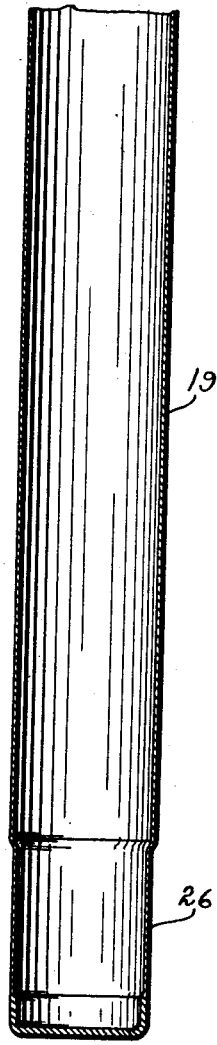
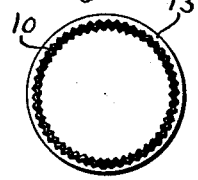
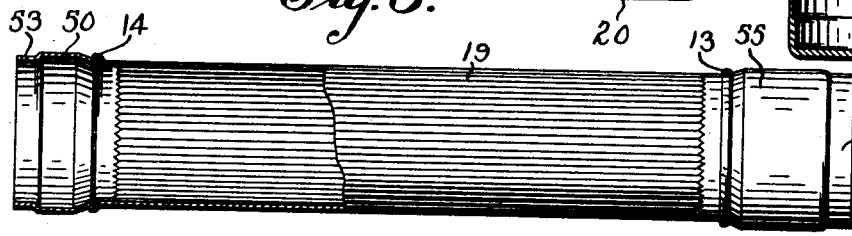
Inventor
Erastus G. Oakley
By Henry E. Rockwell
Attorney April 5, 1927.
E. G. OAKLEY
1,623,807
METHOD OF MAKING FLASH LIGHT CASINGS
Filed Aug. 12, 1924     3 Sheets-Sheet 2
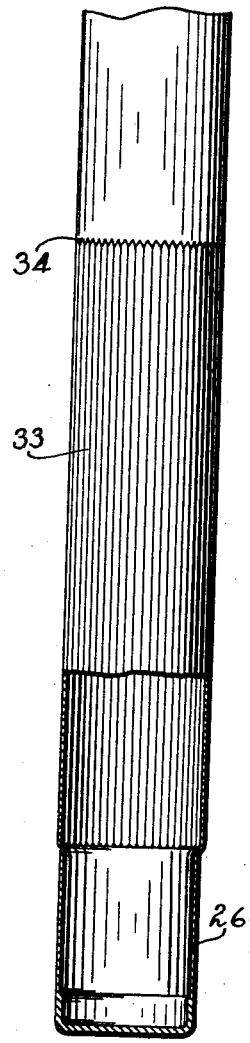
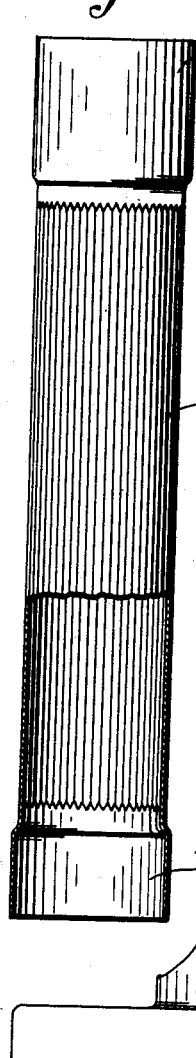
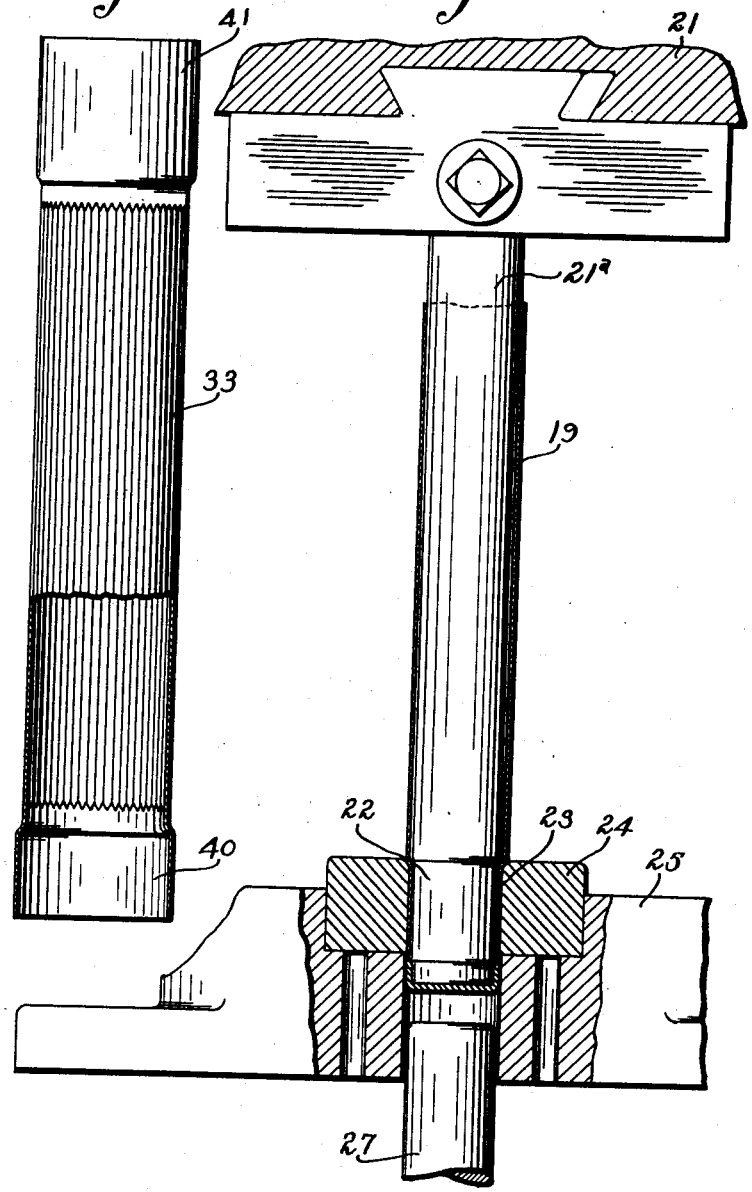

April 5, 1927.
E. G. OAKLEY
1,623,807
METHOD OF MAKING FLASH LIGHT CASINGS
Filed Aug. 12, 1924     3 Sheets-Sheet 3
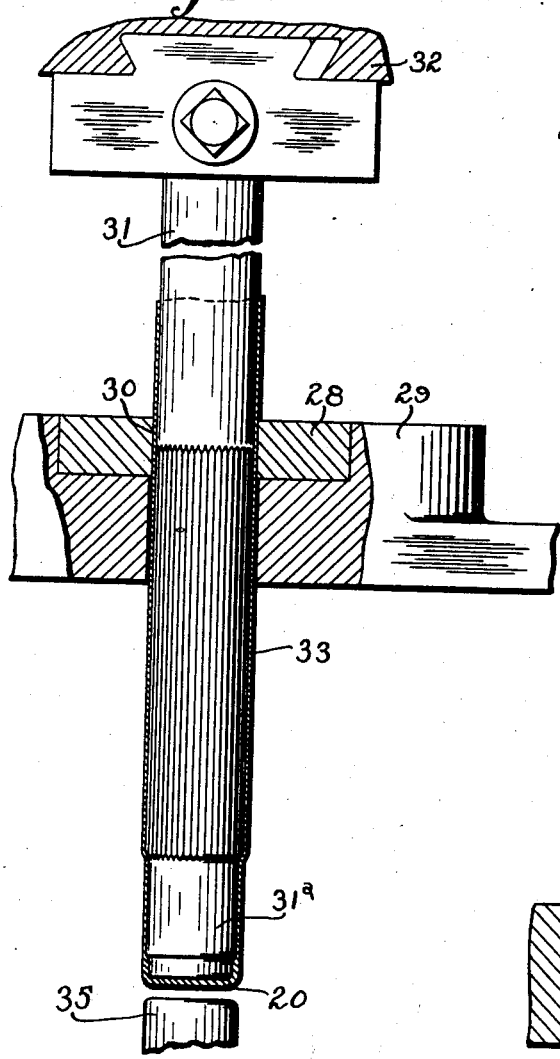
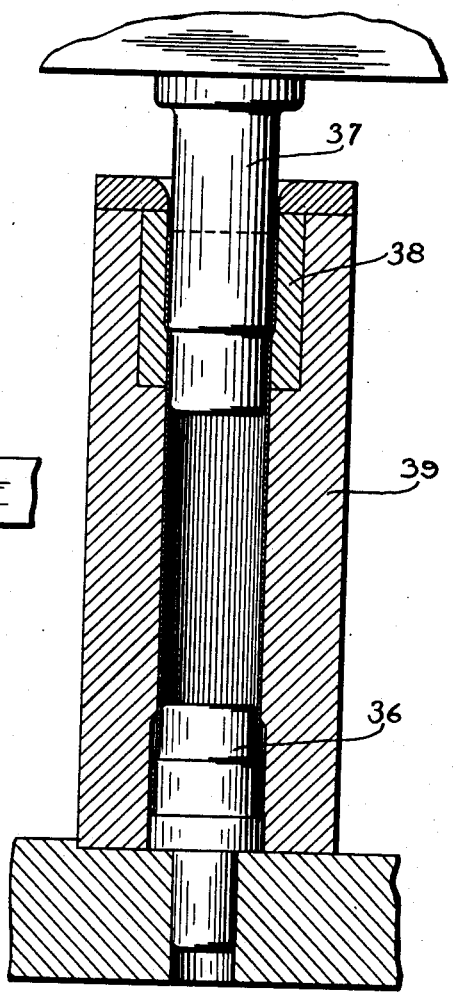
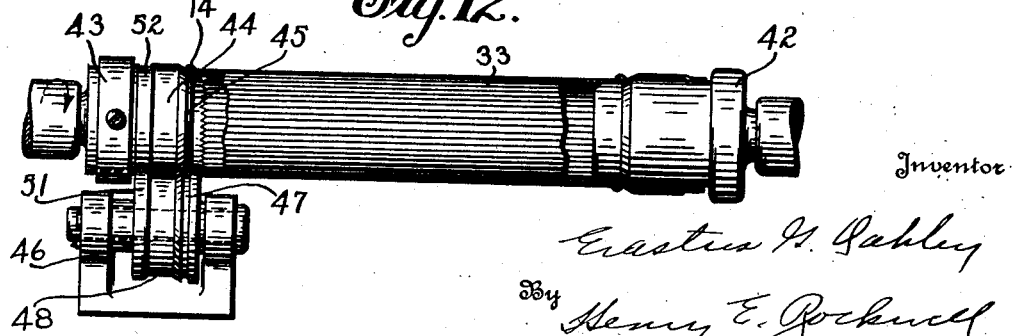
Inventor
Erastus G. Oakley
By Henry E. Rockwell
Attorney Patented Apr. 5, 1927.

1,623,807

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

METHOD OF MAKING FLASH-LIGHT CASINGS.

Application filed August 12, 1924. Serial No. 731,590.

This invention relates to flashlight casings and more particularly to a process for making such casings. In the past flashlight casings have commonly been made of a fibrous material, but such casings are objectionable in certain respects in that they are apt to warp and lose their shape and moreover sometimes become saturated with moisture and thus are rendered less durable than metal casings, which, however, as usually made, also have various disadvantages.

One object of my invention is to provide a metallic flashlight casing fluted for the greater part of the length of the body, the flutes terminating, however, short of the ends of the casings where the usual threads are provided to receive the end caps.

Another object of my invention is to provide an improved process for making metallic flashlight casings such that the bodies of the casings may be provided with longitudinally extending flutes, and the ends left unfluted and formed with the usual beads and threads to receive the end caps.

A still further object of the invention is the provision of an improved method of manufacturing flashlight casings, which comprises forming longitudinal flutes upon the body of the casing between points spaced from the ends thereof by a drawing operation through a die of the proper contour to form said flutes.

More particularly the invention has for its object the reduction of one end of the shell from which the flashlight casing is made so that this end may be inserted into and drawn through a die until longitudinal flutes are formed on the body for the length required, the reduced end, however, being unaffected by the contour of the die so that the flutes are not formed thereon; the reduced end as well as the opposite end of the shell may then be expanded and threaded to provide raised threaded surfaces upon the casing at each end of the fluted portion, as is usually desired in such articles.

Further the invention contemplates the preparation in a novel manner of the expanded ends of the casing upon which the beads and threads are provided.

To these and other ends the invention consists in the novel features and combinations of steps to be hereinafter described and claimed.

In the accompanying drawings:

Fig. 1 is a side elevation view of a flashlight embodying my improvements and constructed in the improved method described herein.

Fig. 2 is an enlarged view of the completed flashlight casing prior to the application of the end caps.

Fig. 3 is a sectional view on line 3—3 of Fig. 2.

Fig. 4 is a longitudinal sectional view of the shell from which the casing is made.

Fig. 5 is a view similar to Fig. 4 showing the shell after one end (the closed end in this instance) has been reduced in diameter.

Fig. 6 is an elevational view, partly in section, of the casing after the flutes have been drawn thereon.

Fig. 7 shows the casing after the ends have been expanded.

Fig. 8 shows the casing after the beads have been formed at each end of the flutes and the ends slowly expanded to a further extent to receive the threads.

Fig. 9 is an elevational view partly in section, showing the method of reducing the end of the shell.

Fig. 10 is a view similar to Fig. 9 showing the fluting operation.

Fig. 11 is a similar view showing the operation of expanding the ends of the shell.

Fig. 12 is a view showing the operation of forming the beads and expanding to a further extent the ends of the shell to receive the threads.

The flashlight casing which I have selected to illustrate and describe as a preferred embodiment of my invention comprises a metallic body portion 10 provided with longitudinal flutes which may extend over substantially the entire surface thereof between the expanded and threaded ends 11 and 12. Adjacent to the ends of the flutes it is customary to provide annular beads shown at 13 and 14. Upon the body of the casing are the usual end caps 15 and 16, the lower cap 16 serving in the ordinary way to hold the battery within the casing and the upper cap securing the lens 17 in the usual way. Upon the body of the casing may be mounted a switch structure 18 of any desired form.

In Fig. 4 of the drawings I have shown a shell 19 from which the casings may be made. This shell may be prepared in any preferred way, but it will be found advantageous to form it by a series of drawing operations beginning, for example, with a flat disc which is first cut and thereafter drawn out to provide the shell 19, having walls of the required thickness, and a closed lower end 20, although the method of forming the shell is not of importance in some of the aspects of the invention.

One end of this shell, preferably the closed end, is thereafter reduced by being drawn into a suitable die as shown in Fig. 9. The tools for performing this operation may comprise a suitable plunger 21 carrying a punch 21ª, which is received within the shell and which is suitably formed at its lower end as shown at 22 to cooperate with the opening 23 of the die 24 supported in a suitable die block 25. After the shell has been drawn into the die to suitably reduce the lower end as shown at 26 in Fig. 5 it may be removed in a well known manner by means of the knockout punch 27.

The lower end having thus been reduced so as to clear the tools used in a succeeding operation in order that this end may be unaffected thereby, the shell may now be fluted by being drawn through a suitable die 28 shown in Fig. 10 as resting upon a die bed 29 and provided with a fluted opening 30. The shell is forced through the die by means of a punch 31 carried by the plunger 32 the punch entering the shell and the lower end thereof being shaped to conform to the reduced end of the shell as shown at 31ª so that if desired the lower end of the punch may engage the closed end 20 of the shell. The punch 30 is provided with corrugations which mate with those of the die 28 so that when the shell is drawn through the die, longitudinal corrugations corresponding to the configuration of the die and punch will be impressed upon the body of the shell as shown at 33 in Fig. 6.

It will be apparent that as the lower reduced end of the shell is sufficiently small in diameter to clear the periphery of the opening of the die, no corrugations will be formed upon this end of the shell, but it will be left in its smooth condition as shown. The shell may be carried through the die to a sufficient extent to corrugate the body for the length required, and usually the operation will proceed to a sufficient extent to leave a short length of the upper end of the tube above the die so that the corrugations terminate at a point spaced from this end as shown at 34. The shell may then be removed from the die by means of the knockout punch 35.

The ends of the shell may now be trimmed to the desired extent, the lower closed end being cut off so that a casing open at both ends results. The ends of the casing may now be expanded as shown in Fig. 11 wherein the casing is shown as being placed over a pilot 36 and the end expanded by means of the expanding punch 37 and die 38, the distortion of the wall of the casing being prevented by the surrounding sleeve 39. By this process both ends of the tube are expanded as shown at 40 and 41 in Fig. 7.

As shown in Fig. 12 the annular beads 13 and 14 may now be formed, the tool being placed in a beading lathe for this purpose. One end of the tube is supported by the tail stock 42 and the other end upon the head stock 43 carrying a loose ring 44 and provided with a bead 45. While the casing is being rotated by the lathe, a tool in the form of a roller 46 is forced against it, the roller being provided with suitable annular beads or ribs to co-act with the configuration of the head stock to give the end of the casing the required shape. A groove 47 in the roller 46 lies opposite the bead 45 on the head stock and similarly a groove 48 lies opposite the loose ring 44 so that the pressure of the beads which bound the grooves 47 and 48 upon the casing will cause it to be expanded into the grooves 47 and 48 so as to provide the bead 14 and the expanded section 50 shown in Fig. 8. At the same time the end of the tube is slightly reduced by being forced into the channel 52 by the rib 51 as shown at 53 in Fig. 8.

The bead 13, the expanded section 55 and reduced end 56 upon the opposite end of the casing are formed in the same manner.

The threads 11 and 12 may then be rolled into the sections 50 and 55, as shown in Fig. 2, and the casing may then be completed by the turning in or trimming of the edges 53 and 56. These edges serve, during the threading operation, to support the wall of the tube and to prevent the distortion or breaking thereof during the threading process. The end caps may then be placed upon the casing and the switch structure 18 mounted thereon and the casing is completed.

While I have shown and described a preferred embodiment of my invention and a preferred method of carrying out the process of manufacturing the casing, it will be understood that the invention is not to be limited to all the details shown or the precise method described, but is capable of variation and modification within the spirit of the invention and the scope of the appended claims.

What I claim is:

1. The method of making a fluted casing which comprises drawing from a suitable blank a tubular shell having a reduced end portion and drawing said shell reduced end first through a fluted die to impress flutes upon the unreduced portion of the shell.

2. The method of making a fluted casing for flashlights or the like which comprises drawing from a suitable blank a tubular shell having a reduced end and drawing said shell reduced end first through a fluted die for a sufficient distance to impress flutes for the required length upon the unreduced portion of the shell, and then backing the shell out of the die so as to leave unfluted a portion of the shell at the unreduced end thereof as well as the reduced end.

3. The method of making flashlight casings or the like having a fluted body portion and unfluted ends, which comprises drawing from a suitable blank a tubular shell having a reduced end portion and forcing said shell reduced end first through a suitable die for the necessary distance to impress flutes upon the body of the shell for the required length.

4. The method of making flashlight casings or the like having a fluted body portion and unfluted ends, which comprises drawing from a suitable blank a tubular shell having a reduced end portion and forcing said shell reduced end first through a suitable die for the necessary distance to impress flutes upon the body of the shell for the required length, and then backing said shell out of the die.

5. The method of making a fluted casing for flashlight casing which comprises reducing one end of a tubular casing and drawing said casing, reduced end first, through a suitable die so that flutes are impressed upon the entire body of the casing passing through the die with the exception of said reduced end.

6. The method of making flashlight casing having flutes of a given length upon its body which comprises reducing one end of a tubular casing and drawing said casing through a suitable fluting die for the required distance, reduced end first.

7. The method of making a tubular casing provided with plain ends and a fluted intermediate body portion which comprises reducing one end of a tubular casing, drawing said casing, reduced end first, through a suitable die until flutes are formed for the required length, the flutes terminating at a point spaced from the unreduced end.

8. The method of making a tubular casing provided with plain ends and a fluted intermediate body portion which comprises reducing one end of a tubular casing, drawing said casing, reduced end first, through a suitable die until flutes are formed for the required length, the flutes terminating at a point spaced from the unreduced end, and then backing the casing out of the die.

9. The method of making flashlight casings or the like which comprises reducing one end of a tubular casing to a sufficient extent to enable it to clear the tools used in a succeeding operation, performing such succeeding operation and then expanding the reduced end of the tube.

10. The method of forming flutes upon the tubular casing beginning at a point spaced from the end thereof which comprises reducing the casing at one end thereof, drawing the casing, reduced end first, through a fluting die and then expanding the reduced end.

11. The method of making a flashlight casing and the like having expanded end portions and an intermediate longitudinal fluted portion which comprises reducing one end of a tubular casing, drawing said casing, reduced end first, through a fluting die, and then expanding the ends of the casing.

12. The method of making a flashlight casing or the like which comprises drawing a tubular shell from a suitable blank reducing one end portion of the shell, drawing said shell, reduced end first, through a fluting die to impress longitudinal flutes upon a portion of the body of the casing and then expanding the unfluted portions at the ends of the casing.

13. The method of making a flashlight casing or the like which comprises drawing from a suitable metallic blank a shell having a closed end, reducing the end portion of the shell adjacent to the closed end, drawing the shell, reduced end first, through a suitable fluting die so that flutes are formed on the shell adjacent said reduced end, trimming off the closed end of the shell and then expanding said end.

14. The method of making a metal flashlight casing having threaded end portions and a fluted intermediate body portion which comprises reducing one end of a tubular shell, drawing said shell, reduced end first, through a die to form flutes for the length required, expanding the unfluted ends of the shell and then forming threads on said expanded portions.

15. The method of making a flashlight casing and the like having end beads and threads and a fluted body portion between said beads which comprises reducing one end of a plain metallic shell, drawing said shell, reduced end first, through a fluting die until flutes are impressed upon the body of the shell for the length required, backing the shell out of the die, expanding the ends of the shell and then forming the end beads and threads upon the expanded portion.

16. The method of making a fluted flashlight casing which comprises forming flutes upon an intermediate part of the casing, and expanding the casing adjacent the ends thereof by rotating it upon a suitable headstock and while rotating applying pressure to the casing at points upon opposite sides of the portion to be expanded.

17. The method of making a fluted flashlight casing which comprises impressing flutes upon the body portion of the casing, slipping the end portion of the casing over a headstock upon which a loose ring is mounted, and while rotating the casing applying pressure thereto at opposite sides of said ring.

18. The method of making a metallic flashlight casing which comprises expanding one end of the casing by inserting within said end a headstock upon which a loose ring is mounted, rotating the headstock and casing, and during such rotation applying pressure to the casing upon opposite sides of the ring.

In witness whereof, I have hereunto set my hand this 9th day of August, 1924.

ERASTUS G. OAKLEY.